United States Patent [19]

Mielnik et al.

[11] Patent Number: 5,275,310
[45] Date of Patent: Jan. 4, 1994

[54] VENTED, NON-RESUABLE, MULTI-DOSE CARTRIDGE

[75] Inventors: Thaddeus J. Mielnik, Apex; William C. Little, Cary, both of N.C.

[73] Assignee: American Sterilizer Company, Erie, Pa.

[21] Appl. No.: 850,645

[22] Filed: Mar. 13, 1992

[51] Int. Cl.⁵ .............................................. B67D 5/60
[52] U.S. Cl. ................................... 222/130; 215/263;
222/147; 222/188; 222/189; 222/416; 222/464;
222/481.5
[58] Field of Search .................. 222/80, 81, 129, 130,
222/147, 188, 189, 402.19, 416, 464, 478, 481,
481.5, 482, 541; 215/263

[56] References Cited

U.S. PATENT DOCUMENTS

| | | | |
|---|---|---|---|
| 2,351,227 | 6/1944 | Petrone | 222/482 X |
| 3,521,745 | 7/1970 | Schwartzman | 206/47 |
| 4,093,129 | 6/1978 | Morane et al. | 222/189 X |
| 4,141,472 | 2/1979 | Spitzer et al. | 222/189 |
| 4,277,001 | 7/1981 | Nozawa | 222/402.19 X |
| 4,301,799 | 11/1981 | Pope, Jr. et al. | 128/272 |
| 4,396,583 | 8/1983 | LeBoeuf | 422/301 |
| 4,794,085 | 12/1988 | Jessop et al. | 436/54 |
| 4,885,253 | 12/1989 | Kralovik | 435/294 X |
| 4,941,519 | 7/1990 | Sestak et al. | 141/22 |
| 4,946,079 | 8/1990 | Campbell | 222/568 X |
| 4,966,313 | 10/1990 | Lina | 222/402.19 |
| 5,037,623 | 8/1991 | Schneider et al. | 422/292 |

Primary Examiner—Andres Kashnikow
Assistant Examiner—Joseph A. Kaufman
Attorney, Agent, or Firm—Jones, Day, Reavis & Pogue

[57] ABSTRACT

A vented cartridge comprises a container having a top surface, a bottom surface, and side surfaces connected together to define a predetermined volume. A dip tube extends from the top surface substantially to the bottom surface. A vent tube extends from the top surface and is positioned coaxially with the dip tube. The vent tube has an upper opening positioned in the upper third of the predetermined volume and a lower opening positioned in the lower third of the predetermined volume. A space between an outer surface of the dip tube and an inner surface of the vent tube forms a central fluid communication path between the upper and lower openings and the top surface. An upper valve is positioned at the upper opening for closing the upper opening if the cartridge is oriented with the top surface facing down; a lower valve is positioned at the lower opening for closing the lower opening if the cartridge is oriented with the top surface facing up. When the cartridge is spent, a liquid feed system pushes the vent tube and dip tube further into the cartridge thereby disconnecting those tubes from the top surface and preventing the cartridge from being reused. A reservoir member is provided which is drained when the vent tube and dip tube are pushed into the cartridge. When the reservoir member is drained, a diluent is released into the cartridge which renders the designed maximum allowable fluid remaining in the cartridge harmless.

9 Claims, 7 Drawing Sheets

VENTED, NON-RESUABLE, MULTI-DOSE CARTRIDGE

BACKGROUND OF THE INVENTION

1. Field of the Invention

The present invention is directed generally to containers and more particularly to single or multi-dose vented containers used to ship liquids requiring ventilation.

2. Description of the Invention Background

In certain types of precision equipment, the liquid dispensed into the equipment must be of high quality and/or precise quantity. To achieve those goals, manufacturers often provide cartridges or containers containing liquid of the desired quality and quantity. However, containers or cartridges which can be refilled by the user are susceptible of being refilled with improper quality or imprecise quantities of liquids. For example, in some hydrogen peroxide sterilization systems, it is necessary to use hydrogen peroxide within a limited concentration range. A more concentrated solution of hydrogen peroxide can be hazardous and a less concentrated solution might be ineffective to achieve sterilization under the conditions present in the particular sterilization system. A technician, unaware of the importance of using a particular type of hydrogen peroxide or other liquid, might refill a liquid container with the incorrect type or volume of liquid.

In addition, continuous reuse of containers tends to contaminate the container. Hydrogen peroxide solutions will degrade into water and oxygen in the presence of certain contaminants resulting in a less concentrated solution which may be ineffective for its intended use. Moreover, if the container is sealed, the buildup of oxygen upon liquid degradation will pressurize the container, perhaps causing the container to burst.

In U.S. Pat. No. 4,941,519 entitled "Liquid Feed System Using A Non-reusable Container" issued Jul. 17, 1990, a solution is provided to the aforementioned problems. Disclosed in that patent is a non-reusable container used in conjunction with a connection member and a cam member. Operation of the cam member forces the connection member downward into fluid communication with the container. Thereafter, fluid can be removed from the container via a dip tube which extends nearly to the bottom of the container. After all of the fluid has been removed, the cam member is again actuated which causes the vent tube/dip tube to be pushed down dislodging it from the cartridge cap rendering the container non-reusable. With the dip tube thus forced into a position in which it can no longer be used to withdraw liquid from the container, the container is not suited to be refilled and reused.

Another example of a sterilant concentration injection system is disclosed in U.S. Pat. No. 5,037,623. The apparatus disclosed in that patent provides an arm/needle configuration which punctures a single-dose cartridge. The cartridge is comprised of a vent passage defining a vent aperture at a first end which is in fluid communication with the exterior of the cartridge. The vent aperture is disposed centrally in three dimensions in the interior volume such that when fluid partially fills the interior volume, the vent aperture remains in the head space of the fluid regardless of the orientation of the cartridge.

Although the cartridge of U.S. Pat. No. 5,037,623 is vented in all orientations of the cartridge, the cartridge is used in a system in which liquid flows through the cartridge. For other types of systems in which the liquid within the cartridge is withdrawn from the cartridge, the thus-spent cartridge requires special handling because of potential residuals left in the cartridge. Thus, the need exists for a non-reusable, vented cartridge capable of dispensing exact amounts of a known quantity of fluid, which, upon being spent, presents no disposal problems.

SUMMARY OF THE INVENTION

The present invention is directed to a vented cartridge comprised of a container having a top surface, a bottom surface, and side surfaces connected together to define a predetermined volume. A dip tube extends from the top surface substantially to the bottom surface. A vent tube extends from the top surface and is positioned coaxially with the dip tube. The vent tube has an upper opening positioned in the upper third of the predetermined volume and a lower opening positioned in the lower third of the predetermined volume. A space between an outer surface of the dip tube and an inner surface of the vent tube forms a central fluid communication path between the upper and lower openings and the top surface. An upper valve is positioned at the upper opening for closing the upper opening if the cartridge is oriented with the top surface facing down; a lower valve is positioned at the lower opening for closing the lower opening if the cartridge is oriented with the top surface facing up.

The vented cartridge of the present invention is intended to be used with a liquid feed system of the type which allows withdrawal of the fluid in the cartridge. When the cartridge is spent, the liquid feed system pushes the vent tube and dip tube further into the cartridge thereby disconnecting those tubes from the top surface and preventing the cartridge from being reused. In one embodiment of the invention, a reservoir member is provided which is drained when the vent tube and dip tube are pushed into the cartridge. When the reservoir member's seal is broken, a diluent is released into the cartridge which renders the designed maximum allowable remaining fluid in the cartridge harmless. The vented cartridge of the present invention provides a multi-dose cartridge which provides the exact quantity and quality of liquid needed for the intended process. After the cartridge has been spent, the cartridge is mechanically disabled so that it is incapable of being refilled and used again. At the same time that the cartridge is being mechanically disabled, any remaining fluid in the cartridge is being diluted to a point where the cartridge may be disposed of in ordinary trash. Finally, the cartridge is vented during shipping no matter what orientation the cartridge may assume. Those, and other advantages and benefits of the present invention, will become apparent from the description of a preferred embodiment hereinbelow.

BRIEF DESCRIPTION OF THE DRAWINGS

For the present invention to be clearly understood and readily practiced, it will now be described in conjunction with the following figures wherein.

DESCRIPTION OF A PREFERRED EMBODIMENT

Figure 1:
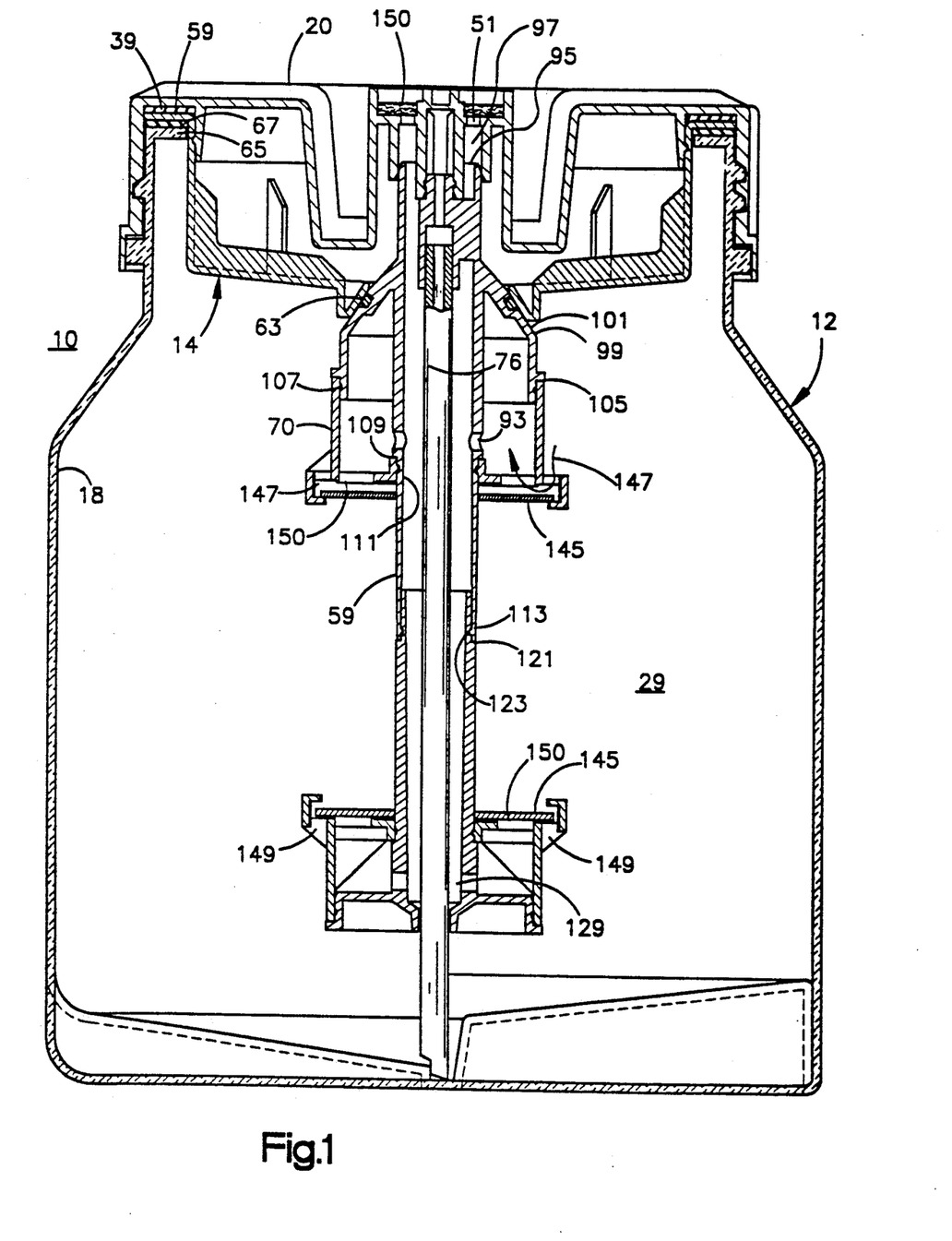
FIG. 1 is a cross-sectional view of the vented cartridge of the present invention.

FIG. 1 illustrates a vented cartridge 10 constructed according to the teachings of the present invention. The vented cartridge 10 can be broken down into three functional components: a container 12 which defines a predetermined volume for carrying hydrogen peroxide or any other liquid of interest; a reservoir member 14 for carrying a diluent appropriate for the liquid carried by container 12; and a vent tube/dip tube assembly 16 which provides the means for venting the cartridge 10 as well as withdrawing the liquid from the container 12.

The vented cartridge 10 of the present invention is intended to be used in conjunction with a liquid feed system of the type disclosed and claimed in the aforementioned U.S. Pat. No. 4,941,519, the contents of which are hereby incorporated by reference. Disclosed in that patent is a housing which includes a top portion in which a cam member is positioned, a midportion in which a connection member is positioned, and a bottom portion having an opening for receiving the vented cartridge 10 of the present invention. The cam member moves a needle carried by the connection member into a first position for sealingly engaging the vent tube/dip tube assembly 16 of the vented cartridge 10 to effect transfer of liquid from the vented cartridge 10 to an inlet port of the liquid feed system. The cam member thereafter assumes a second position wherein the vent tube/dip tube assembly 16 is rendered inoperative and, simultaneously, causes the release of the diluent from reservoir member 14. The diluent dilutes the designed maximum allowable remaining liquid in the cartridge thereby enabling the cartridge to be disposed of with other office trash. The cam thereafter moves into a third position which allows the vented cartridge 10 to be removed and replaced with another vented cartridge 10 having a fresh supply of liquid. The present invention is directed primarily to the vented cartridge 10. The reader desiring more details of the liquid feed system is directed to the aforementioned U.S. Pat. No. 4,941,519.

Figure 2:
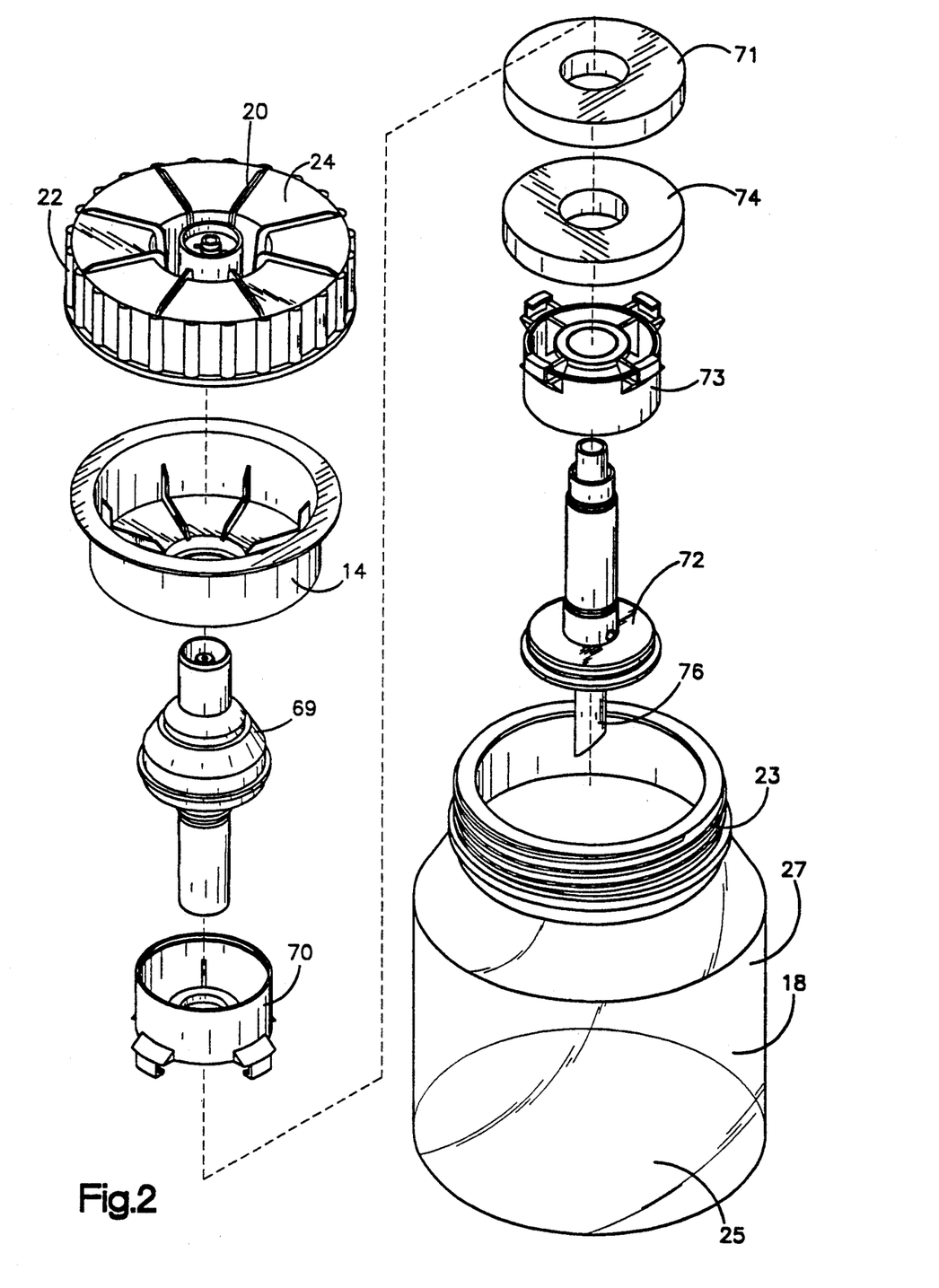
FIG. 2 is an exploded view illustrating the components of the vented cartridge of the present invention.

Turning now to a description of the first major component, the container 12, of the vented cartridge 10, the container 12 is seen in FIG. 2 to be comprised of a jar or bottle shaped member 18 and an appropriately sized lid 20. The container 12 is thus seen as having a top surface 24 provided by the lid 20, a bottom surface 25 which is the bottom of bottle shaped member 18, and a side surface 27 which, in the case of bottle shaped member 18, is cylindrical in shape. The lid 20 carries threads 22 which mate with threads 23 carried by the bottle shaped member 18. In a conventional manner, lid 20 is screwed onto the bottle shaped member 18. When the lid 20 is screwed onto the bottle shaped member 18, the top surface 24 combines with the side surface 27 and bottom surface 25 to define a predetermined volume 29 which the container 12 can hold.

Figure 3:
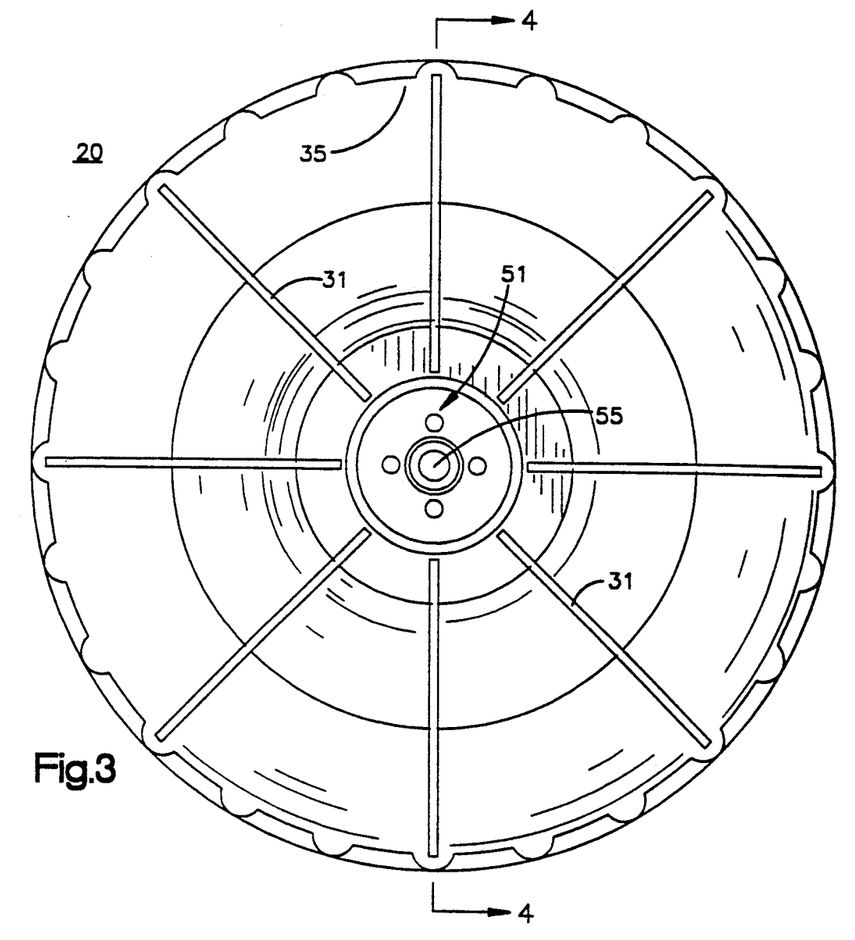
FIGS. 3 and 4 illustrate the lid of the vented cartridge.
Figure 4:
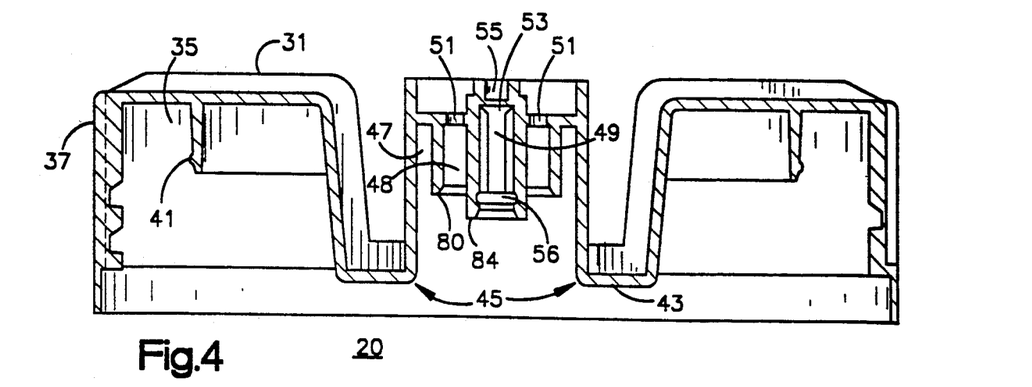

The lid 20 is shown in greater detail in FIG. 3, which is a view looking downward on top of the lid, and in FIG. 4, which is a cross-sectional view taken along the lines IV—IV in FIG. 3. In FIG. 3, the lid 20 is provided with a plurality of reinforcing ribs 31. An annular space 35 receives an annular sealing member 39, seen in FIG. 1. The annular sealing member 39 may be retained in the annular space 35 by the diluent reservoir member 14 that is snapped into place using retaining bead 41. The function of the annular sealing member 39 will be described in detail hereinbelow.

Also illustrated in FIG. 4 is an annular projection 43 formed in the underside of the lid 20. The annular projection 43 defines a circular opening 45. The circular opening 45 may be divided into three portions, an outer annular area 47 extending between annular projection 43 and a cylindrical wall 80, an inner annular area 48 extending between cylindrical wall 80 and a second cylindrical wall 84, and a central circular area 49 defined by the second cylindrical wall 84. As best seen in FIG. 1, inner annular area 48 and central circular area 49 are sized to receive the upper end of the vent tube/dip tube assembly 16.

Lid 20 contains four apertures 51 located in annular area 48. The purpose of apertures 51 will become clear after the vent tube/dip tube assembly 16 has been described.

Completing the description of the lid 20, the second cylindrical wall 84 defines a bore 53 which is sealed from atmospheric pressure by an extremely thin and frangible portion 55 of the lid 20. The bore 53 carries a detente 56 which is used to mechanically hold the vent tube/dip tube assembly 16 together with the lid 20 as will be described more fully hereinbelow.

Figure 5:
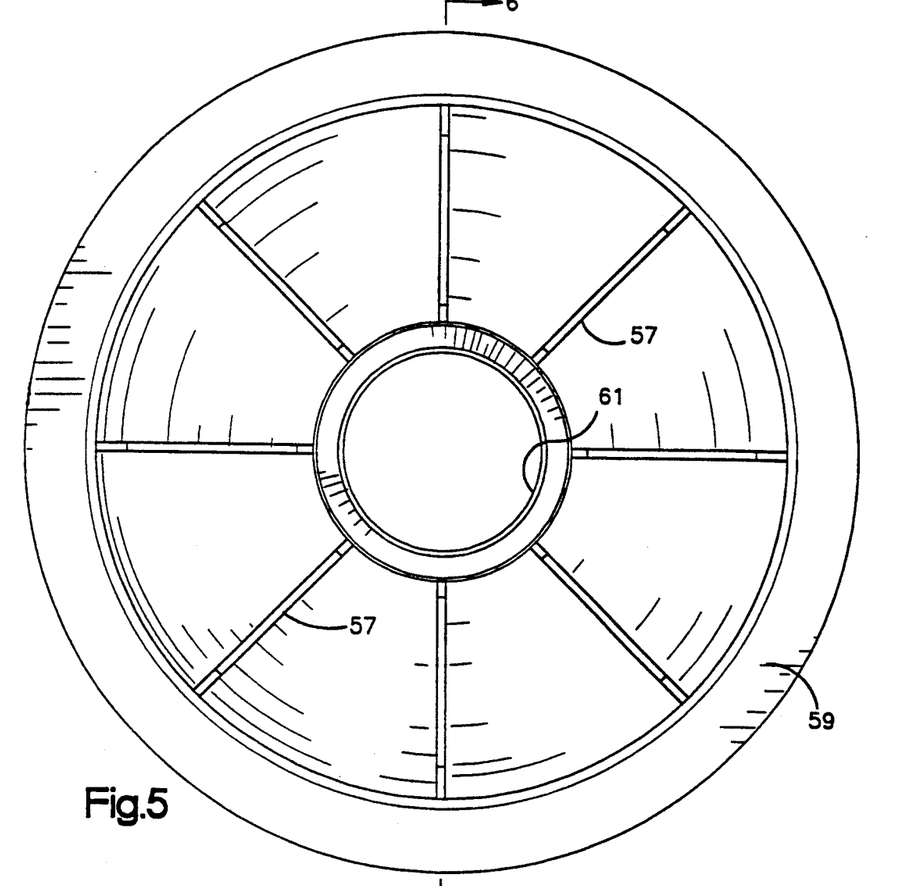
FIGS. 5 and 6 illustrate the reservoir member of the vented cartridge.
Figure 6:
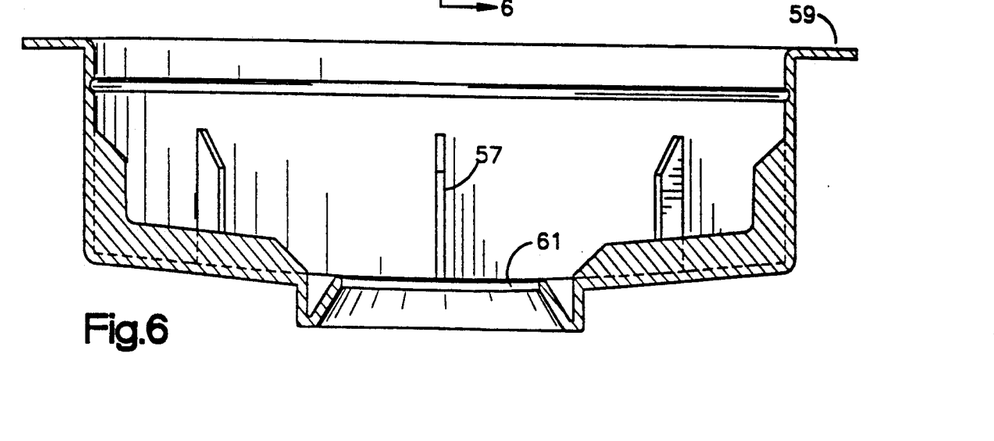

The reservoir member 14 is shown in greater detail in FIG. 5, which is a view looking upward into the reservoir member 14, and in FIG. 6, which is a cross-sectional view taken along the lines VI—VI in FIG. 5 The reservoir member 14 contains a plurality of radially extending reinforcing ribs 57. The reservoir member 14, as seen in FIG. 6, is substantially cylindrical in shape and is characterized by having an outwardly extending lip 59, an open top, and a closed bottom having a central bore 61.

Turning to FIG. 1, it is seen that the central bore 61 is sized to allow the reservoir member 14 to rest upon, and firmly engage, a conical surface of the vent tube/dip tube assembly 16. An O-ring 63 or other type of sealing member may be provided in the area in which the reservoir member 14 abuts the vent tube/dip tube assembly 16 so as to ensure that the diluent carried in the reservoir 14 does not leak.

Remaining with FIG. 1, it is seen that the bottle shaped member 18 carries an inwardly extending lip 65 around its upper periphery. Upon lip 65 is positioned an annular sealing member 67. The outwardly extending lip 59 of the reservoir member 14 is sized to fit on top of annular sealing member 67 as shown in the figure. When lid 22 is screwed on to the top of the bottle snaped member 18, annular sealing member 39 is brought into engagement with outwardly extending lip 59. By applying torque to lid 20, annular sealing members 39 and 67 are compressed, thereby forming a seal between the bottle shaped member 18 and reservoir member 14, and a seal between reservoir member 14 and lid 20, respectively. In that manner, neither the diluent carried by reservoir member 14 nor the liquid carried by container 12 can leak. As will be described further hereinbelow, the purpose of the reservoir member 14 is to be drained upon removal of all the liquid from the container 12 so that the designed maximum allowable residual liquid in container 12 may be diluted to such an extent that the vented cartridge 10 may be disposed with ordinary office trash.

Figure 7:
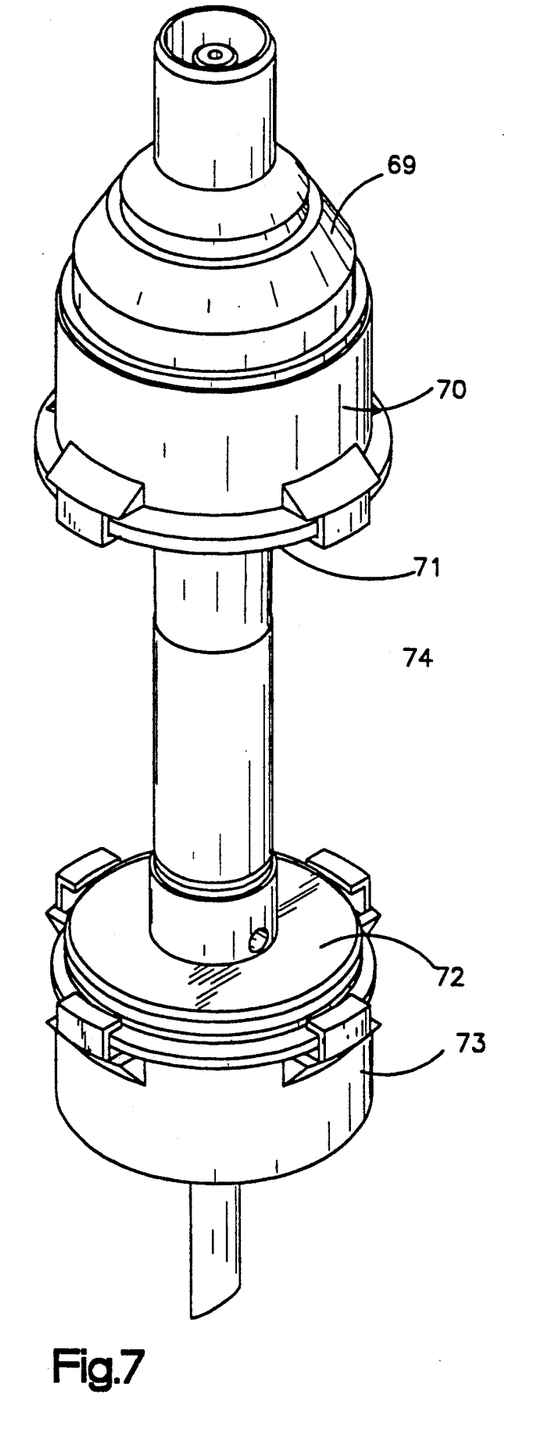
FIG. 7 illustrates the vent tube/dip tube assembly of the vented cartridge.
Figure 8:
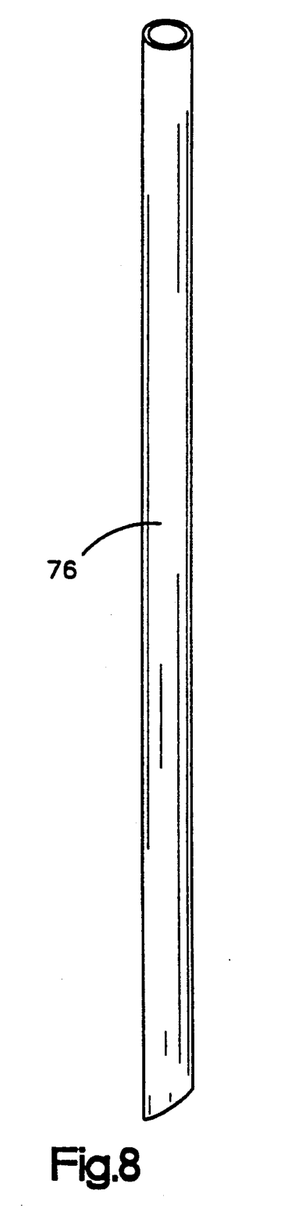
FIG. 8 illustrates the dip tube of the vented cartridge.

The vent tube/dip tube assembly 16 is shown in detail in FIG. 7. The vent tube/dip tube assembly 16 is comprised of an upper vent tube portion 69 which carries an upper vent guard 70 and an upper movable member 71 and a lower vent tube portion 72 which carries a lower vent guard 73 and a lower movable member 74. A vent tube 76, illustrated in FIG. 8, extends substantially throughout the length of the vent tube/dip tube assembly 16 and extends out the bottom of that assembly as seen in FIG. 1.

Figure 9:
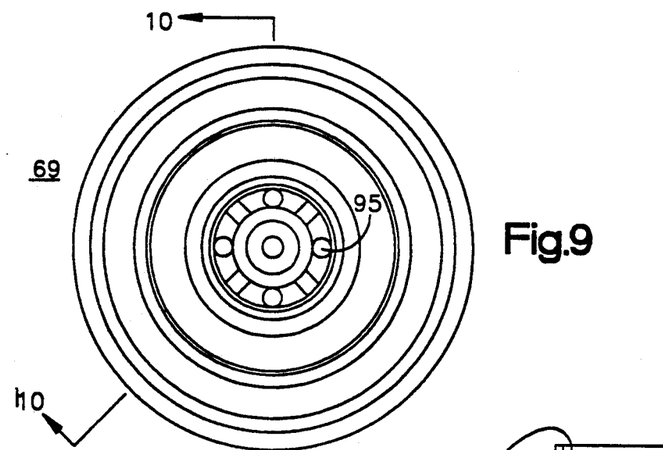
FIGS. 9 and 10 illustrate the upper vent tube portion.
Figure 10:
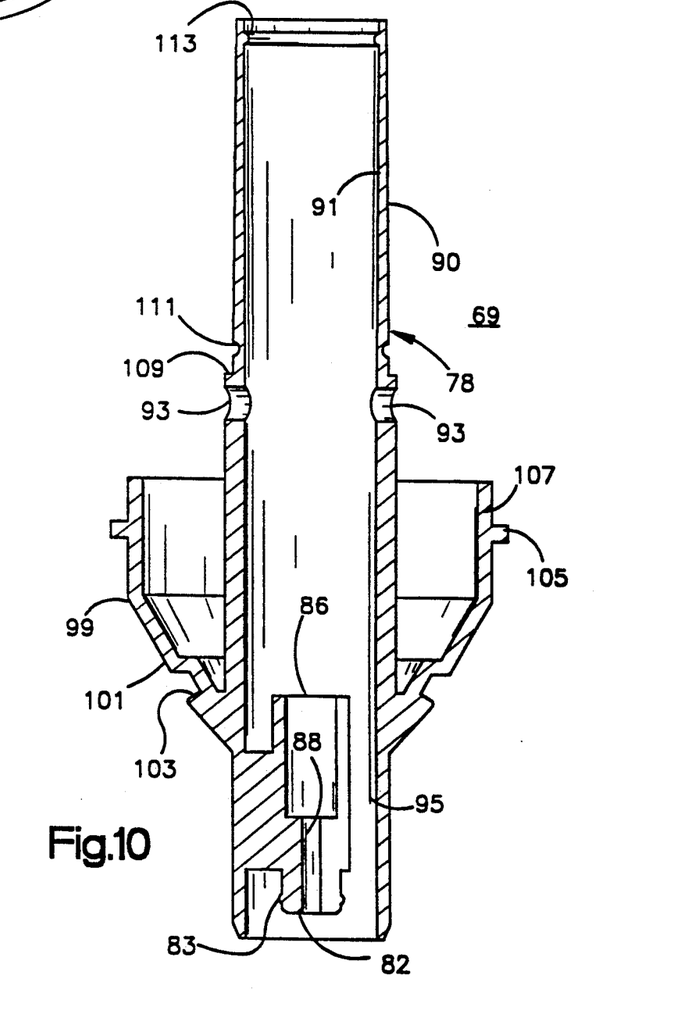
Figure 11:
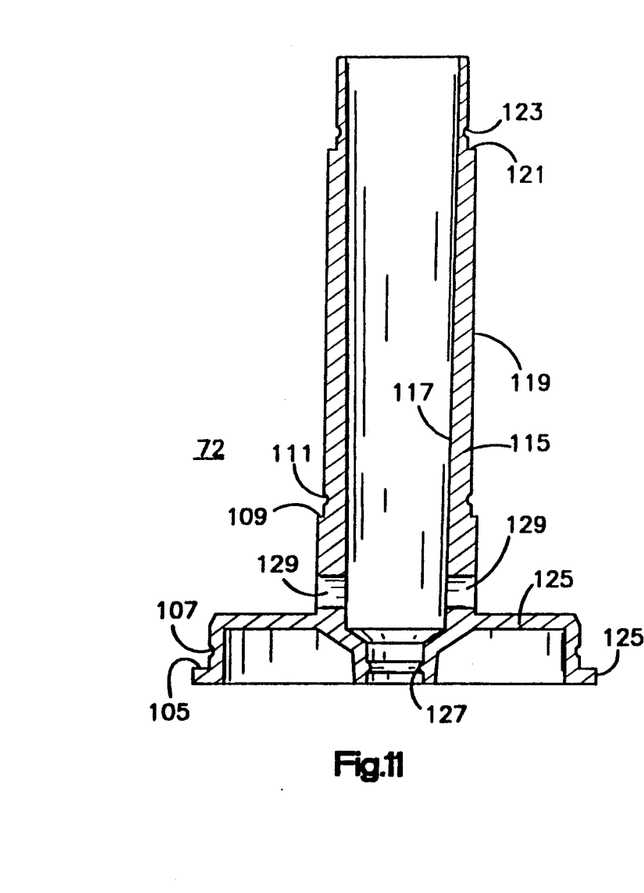
FIG. 11 illustrates the lower vent tube portion.

As mentioned, the vent tube is actually comprised of an upper vent tube portion 69, shown in detail in FIGS. 9 and 10, and a lower vent tube portion 72 illustrated in detail in FIG. 11. Turning first to the upper vent tube portion 69, FIG. 9 is a view looking up into the upper vent tube portion 69 while FIG. 10 is a cross-sectional view taken along the lines X—X in FIG. 9. In FIG. 10, the upper vent tube is comprised essentially of a cylindrical wall 78 which, at its upper end, is sized to provide a friction fit (seen in FIG. 1) with the wall 80 defining the inner annular area 48.

The upper end of the upper vent tube portion 69 contains a crown member 82 centrally located within circular wall 78. The crown member 82 is rigidly connected to the circular wall 78 except for four bores 95 seen best in FIG. 9. As seen in FIG. 1, the four bores 95 are in fluid communication with an air space 97 formed by inner annular area 48. The air space 97 is in fluid communication with atmospheric pressure through the apertures 51 in the inner annular area 48 of lid 20.

Crown member 82 carries a raised bead 83. The crown member 82 and bead 83 are sized to provide a friction fit within the wall 84 defining central circular area 49 and detente 56, respectively, as best seen in FIG. 1. The lower end of crown member 82 contains a circular opening 86 sized to receive dip tube 76. Finally, crown member 82 has a central bore 88 extending therethrough.

When the frangible portion 55 of lid 20 is broken, a fluid communication path to the bottom of the container 12 is established through lid 20, bore 53 defined by wall 84, the central bore 88 of crown member 82, and the dip tube 76. Thus, it is seen that a fluid communication path is established from the top surface 24 to substantially the bottom surface 25. Dip tube 76 may have an angled bottom to enable the maximum amount of fluid to be withdrawn from container 12. Alternatively, or in conjunction therewith, the bottom of container 12 may be sloped as illustrated in phantom in FIG. 1 to facilitate maximum removal of the fluid contained within container 12.

Returning to a description of FIG. 10, the circular wall 78 has an outside surface 90 and an inside surface 91. Upper apertures 93 extending through wall 78 from inside surface 91 to outside surface 90 permit fluid communication between the interior volume of upper vent tube portion 69 and the predetermined volume 29 defined by container 12. Upper apertures 93 may be located, for example, so as to be in the upper third of the predetermined volume 29.

In FIG. 10, it is seen that the upper vent tube portion 69 carries a skirt member 99 which is configured to provide a surface 101 upon which reservoir member 14 may rest and a groove 103 for retaining the O-ring 63. The skirt member 99 has at its outer periphery an outwardly extending lip which provides a first shoulder 105 and a detente 107. Formed in the outside surface 90 is a second shoulder 109 and detente 111. The two shoulders 105 and 109 and the two detentes 107 and 111 are used to retain upper vent guard 70 as will be described in greater detail hereinbelow.

Finally, the circular wall 78 of upper vent tube portion 69 carries appropriate means to enable mechanical linkage with lower vent tube portion 72. In the instant embodiment, such mechanical means includes an inwardly extending bead 113 formed on the inside surface 91 of circular wall 78. The reader will understand, however, that other types of mechanical means for connecting the upper vent tube portion 69 and lower vent tube portion 72 may be provided.

The lower vent tube assembly 72 is illustrated in FIG. 11. The lower vent tube assembly 72 is comprised essentially of a cylindrical wall 115. The upper end of the cylindrical wall 115 has a reduced outside diameter sized to fit inside of the lower end of the upper vent tube portion. A step or shoulder 121 is present where the area of reduced outside diameter begins. Also carried by the outside surface 119 is a detente 123. As seen in FIG. 1, the lower end of upper vent tube portion 59 slides along the area of reduced diameter until it strikes shoulder 121 at which time the bead 113 engages detente 123. In that manner, the upper vent tube portion 69 and lower vent tube portion 72 are mechanically interconnected.

The lower vent tube portion 72 carries a circular member 125. The circular member 125 has an outwardly extending lip forming a first shoulder 105, and a corresponding detente 107. Formed in the outer surface of wall 115 is a second shoulder 109 and a corresponding detente 111. First and second shoulders 105 and 109 and first and second detentes 107 and 111, respectively, perform the same functions with respect to the lower vent tube portion 72 as they perform with respect to the upper vent tube portion 69 and therefore have been given the same reference numerals as were given in the description of the upper vent tube portion.

Completing the description of the lower vent tube portion 72 illustrated in FIG. 11, wall 117 contains a bead 127 sized to sealingly engage dip tube 76. The cylindrical wall 115 has an inside surface 117 and an outside surface 119. Wall 117 has lower apertures 129 extending therethrough from the inside surface 117 to the outside surface 119 which allow the interior volume of the lower dip tube portion 72 to be in fluid communication with the predetermined volume 29 of the container 12. The apertures 129 may be located, for example, in the lower third of the predetermined volume 29.

Figure 12:
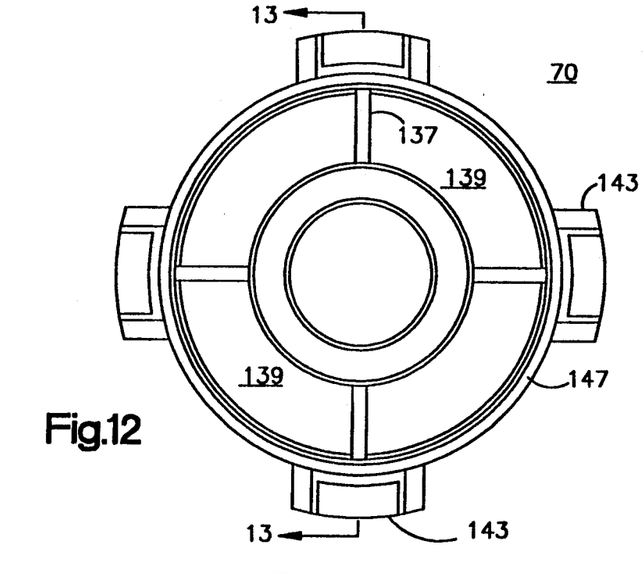
FIGS. 12 and 13 illustrate the upper and lower vent guard of the vented cartridge.
Figure 13:
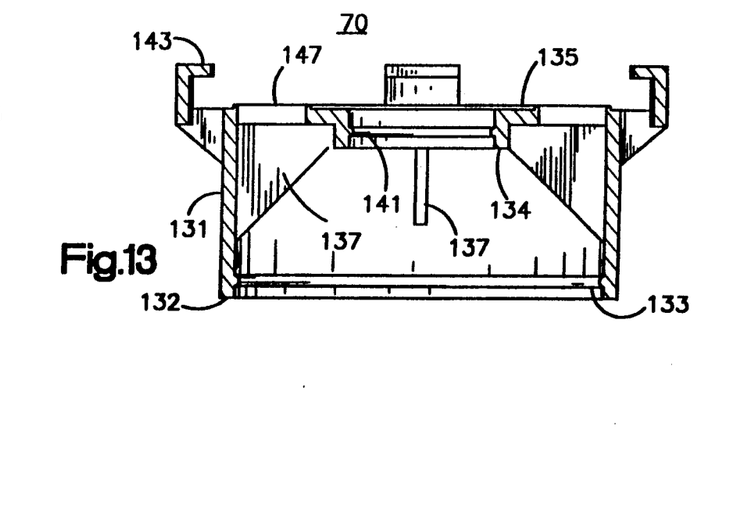

The final components of the vent tube/dip tube assembly 16 are the upper vent guard 70 and the lower vent guard 73 which are illustrated in detail in FIG. 12, which is a view looking up into vent guard 70, and FIG. 13 which is a cross-sectional view taken along the lines XIII—XIII in FIG. 12. The upper vent guard 70 and lower vent guard 73 are identical in construction and operation such that only one need be described. As seen in FIG. 13, upper vent guard 70 is substantially comprised of a cylindrical wall 131. The cylindrical wall 131 carries a raised bead 133 on its interior surface at one end thereof. At the other end of the cylindrical wall 131, the upper vent guard 70 includes a central ring 135 which is connected to the cylindrical wall 131 through a plurality of ribs 137. Central ring 135 and ribs 137 cooperate to define a plurality of openings 139 seen best in FIG. 12. Ring 135 carries a raised bead 141 along its interior surface.

As previously mentioned, the upper vent guard 70 is carried on the upper vent tube portion 69. That is accomplished in the following manner. Referring to FIG. 1, it is seen that the inside diameter of one end of the vent guard 70 is sized to fit over the outside diameter of skirt member 99. When so positioned, a transverse edge 132 of wall 131 butts against shoulder 105 and raised bead 133 engages detente 107. Similarly, a transverse edge 134 of central ring member 135 butts against shoulder 109 and raised bead 141 engages detente 111. In that manner, upper vent guard 70 is fixably carried by upper vent tube portion 69. The upper vent guard 70 is positioned such that cylindrical wall 131 surrounds apertures 93. The reader will understand that lower vent guard 73 is similarly constructed, is likewise fixably carried by lower vent tube portion 72, and is positioned such that cylindrical wall 131 surrounds apertures 129.

Upper vent guard 70 has a plurality of C-shaped members 143 extending from the exterior surface of wall 131 at one end thereof. The C-shaped members 143 are used to retain movable members 145 best seen in FIGS. 1 and 2. The movable members 145 are annularly shaped and sized to entirely cover openings 139 when the movable member is adjacent to surface 147 of the vent guard 70. That is referred to as the valve seat position. By virtue of the movable member's 145 annular shape, the movable member is capable of sliding along either the upper vent tube portion 69 or the lower vent tube portion 72, wherever it happens to be located. Movement away from the valve seat position is ultimately restrained by the C-shaped members 143. When the movable member is engaging C-shaped members 143, that position is referred to as the valve stop position.

Referring now to FIG. 1, the operation of the cartridge 10 of the present invention will now be described. Prior to transportation, lid 20 is screwed tightly onto bottle-shaped member 18 thereby sealing the liquid within container 12 and the diluent within reservoir 14. When the cartridge 10 is oriented such that the top surface 24 is facing up, the force of gravity acting upon movable member 145 carried on the lower vent tube portion 72 will move member 145 into the valvé seat position. As seen from the figure, when the movable member 145 is in the valve seat position, apertures 139 are covered. In that manner, the lower vent guard 73 and movable member 145 form a valve which affectively controls apertures 129.

While the cartridge 10 is oriented with the top surface 24 facing up, movable member 145 carried on the upper vent tube portion 69 will be in the valve stop position. In that position, apertures 139 are not covered. Accordingly, as indicated by arrows 147, an upper fluid communication path between upper apertures 93 and the predetermined volume 29 is established. The upper apertures 93 are also in fluid communication with the atmosphere through the following path. The inside surface 91 of the upper vent tube portion 69 and the inside surface 117 of the lower vent tube portion 72 cooperate with the outside surface of the dip tube 76 to form an annular, central, fluid communication path running essentially the entire length of the vent tube/dip tube assembly 16. That fluid communication path then continues through bores 95, airspace 97, and apertures 51 in the inner annular area 48 of lid 20. Thus, when the vented cartridge 10 is so oriented, a vent path between the head space of the liquid and the atmosphere is provided.

In the event that the cartridge 10 is oriented so that the top surface 24 is facing down, the function of the upper vent guard 70 and lower vent guard 73 are essentially reversed. That is, in such an up-side-down orientation, movable member 145 carried on upper vent tube portion 69 will, by virtue of gravity, be in the valve seat position. Accordingly, apertures 139 will be covered and apertures 93 will be essentially sealed off from the predetermined volume 29. However, movable member 145 carried on the lower vent tube portion 72 will be in the valve stop position. As such, apertures 139 of the lower vent guard 73 will provide a lower fluid communication path as indicated by broken arrows 149. Thus, apertures 129 will be in fluid communication with the predetermined volume 29 through the lower fluid communication path. Apertures 129 are in fluid communication with the atmosphere through the aforementioned central fluid communication path.

Those of ordinary skill in the art will recognize that it is desirable to place hydrophobic membranes 150 at some point in the upper and lower fluid communication paths and/or the central fluid communication path. As shown in FIG. 1, hydrophobic membranes 150 are shown positioned over openings 139 and covering apertures 51.

Although it is anticipated that the vented cartridge 10 may be filled with any volume of fluid so long as at least one of the upper and lower fluid communication paths remains in the head space of the fluid, in the preferred embodiment in which hydrogen peroxide is carried by the vented cartridge 10, the hydrogen peroxide level will be below the C-shaped members 143 carried by the lower vent guard 73. In an upright orientation, movable member 145 carried by lower vent tube portion 72 will, by force of gravity, be in the valve seat position such that the hydrophobic membranes 150 of lower vent guard 73 are protected from splashing hydrogen peroxide. At the same time, movable member 145 carried by the upper vent tube portion 69 will be in the valve stop position such that the upper fluid communication path will be open. The vent guards' 70 and 73 construction is the result of the design requirements for their openings 139 to permit the required air transmissability through the hydrophobic membrane 150 to prevent overpressurization of the bottle. Thus, whether the cartridge is oriented in an upright position or in an up-side-down position, the cartridge 10 will always be capable of being vented.

Should the cartridge 10 be oriented on its side, the force of gravity will be insufficient to close off either the upper or the lower fluid communication paths when the cartridge is properly filled. In such an orientation, the level of hydrogen peroxide will be below both the upper and lower fluid communication paths. Through the aforementioned construction, it is seen that the vented cartridge 12 is vented in all orientations during shipment.

When the vented cartridge 10 is to be used, a needle, not shown, punctures the frangible area 55 of the lid 20 and enters the bore 53 defined by wall 84. The frangible surface 55 is forcibly pushed back by entry of the needle such that a seal is formed between the needle and the frangible surface 55. At that point, the contents of container 12 may be withdrawn by use of a vacuum. The fluid communication paths which are allowed for venting during transportation and storage, are now relied upon to provide air to replace the withdrawn fluid to prevent the cartridge 10 from collapsing. During that function, the hydrophobic membranes 150 filter the ambient incoming air to prevent contamination that could degrade the hydrogen peroxide.

After the contents of the container 12 have been withdrawn, the needle is inserted further until it contacts crown member 82. Further insertion of the needle forces the entire vent tube/dip tube assembly 16 out of engagement with lid 20 thus rendering cartridge 10 incapable of being reused. At the same time that the vent tube/dip tube assembly 16 is pushed out of engagement with lid 20, the seal between the reservoir 14 and the vent tube/dip tube assembly 16 is broken thereby allowing the diluent to enter container 12. In the case of hydrogen peroxide carried in container 12, the diluent carried in reservoir member 14 may be water. The water will dilute the designed maximum allowable remaining hydrogen peroxide to a 3% or less concentration in container 12 such that the vented cartridge 10 may be thrown out with normal office trash.

The vented cartridge 10 of the present invention provides a multi-dose cartridge which provides the exact quantity and quality of liquid needed for the intended process. After the cartridge has been spent, the cartridge 10 is mechanically disabled so that it is incapable of being refilled and used again. At the same time that the cartridge 10 is being mechanically disabled, the designed maximum allowable remaining fluid in the cartridge is being diluted to a point where the cartridge may be disposed of in ordinary trash. Finally, the cartridge is vented during shipping no matter what orientation the cartridge may assume. Such a cartridge represents an advance over the state of the art.

While the present invention has been described in conjunction with a preferred embodiment, those of ordinary skill in the art will recognize that many changes and modifications can be made to the preferred embodiment described herein. All such changes and modifications are intended to be covered by the foregoing description and the following claims.

What is claimed is:

1. A vented cartridge for containing a predetermined volume of a liquid, comprising:
   a container having a top surface, a bottom surface, and at least one side surface connected together to define a predetermined volume;
   a dip tube extending from said top surface substantially to said bottom surface;
   a vent disposed within said container and extending from said top surface, the vent having an upper opening positioned in the upper third of said volume and a lower opening positioned in the lower third of said volume, said vent providing a fluid communication path leading to the atmosphere between said upper and lower openings and said top surface;
   an upper valve positioned at said upper opening for said upper opening if said cartridge is oriented with said top surface facing down; and
   a lower valve positioned at said lower opening for said lower opening if said cartridge is oriented with said top surface facing up.

2. The vented cartridge of claim 1 wherein said vent includes a vent tube extending from said top surface and positioned approximately coaxially with said dip tube, a space between an outer surface of said dip tube and an inner surface of said vent tube forming said fluid communication path.

3. The vented cartridge of claim 2 wherein said upper valve includes an upper vent guard fixedly carried on said vent tube and a movable member slidably carried on said vent tube, said vent guard confining the movement of said movable member between a valve seat position and a valve stop position such that when said cartridge is oriented with said top surface facing up, said movable member is in said valve stop position thereby opening an upper fluid communication path between said upper opening and said predetermined volume, and when said cartridge is oriented with said top surface facing down, said movable member is in said valve seat position thereby closing said upper fluid communication path.

4. The vented cartridge of claim 3 wherein said lower valve includes a lower vent guard fixedly carried on said vent tube and a movable member slidably carried on said vent tube, said vent guard confining the movement of said movable member between a valve seat position and a valve stop position such that when said cartridge is oriented with said top surface facing down, said movable member is in said valve stop position thereby opening a lower fluid communication path between said lower opening and said predetermined volume, and when said cartridge is oriented with said top surface facing up, said movable member is in said valve seat position thereby closing said lower fluid communication path.

5. The vented cartridge of claim 4 additionally comprising a first hydrophobic membrane positioned in said upper fluid communication path and a second hydrophobic membrane positioned in said lower fluid communication path.

6. The vented cartridge of claim 2 additionally comprising a reservoir member attached to said top surface to define a reservoir therebetween for storing a diluent, a portion of said reservoir member sealingly engaging said vent tube such that upon disconnection of said vent tube from said top surface, said sealing engagement is broken and said diluent is released into said container.

7. The vented cartridge of claim 6 wherein said vent tube has a conical outer surface and a groove formed in said conical outer surface, and wherein said reservoir has a conically shaped opening in its bottom for contacting said conical outer surface of said vent tube in the area of said groove, said vented cartridge additionally comprising an O-ring positioned in said groove for forming said sealing engagement between said reservoir member and said vent tube.

8. The vented cartridge of claim 6 wherein said container is partially filled with hydrogen peroxide solution and said reservoir is filled with water.

9. The vented cartridge of claim 2 wherein said vent tube is comprised of an upper vent tube portion mechanically interconnected to a lower vent tube portion.

* * * * *

UNITED STATES PATENT AND TRADEMARK OFFICE
CERTIFICATE OF CORRECTION

PATENT NO. : 5,275,310
DATED : January 4, 1994
INVENTOR(S) : Thaddeus J. Mielnik, et. al.

It is certified that error appears in the above-indentified patent and that said Letters Patent is hereby corrected as shown below:

On the Title page, item [54] and col. 1, line 1, in the title should read-- NON-REUSABLE--.

Signed and Sealed this

Twenty-eighth Day of June, 1994

Attest:

BRUCE LEHMAN

*Attesting Officer*     *Commissioner of Patents and Trademarks*